Figure 1:
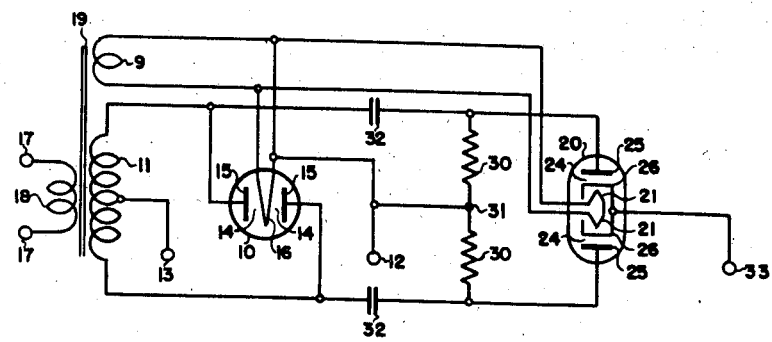

Jan. 27, 1942.   R. B. J. BRUNN   2,271,181
RECTIFIER SYSTEM
Filed Nov. 2, 1939

INVENTOR
ROBERT B. J. BRUNN
BY *Laurence B. Dodds*
ATTORNEY

Patented Jan. 27, 1942

2,271,181

UNITED STATES PATENT OFFICE 2,271,181

RECTIFIER SYSTEM

Robert B. J. Brunn, Chicago, Ill., assignor to Hazeltine Corporation, a corporation of Delaware Application November 2, 1939, Serial No. 302,556

13 Claims. (Cl. 175—363)

This invention relates to rectifier systems and more particularly to rectifier systems for deriving from a single alternating current supply circuit two unidirectional voltages, one of which is considerably higher than that obtained from a conventional rectifier circuit.

Rectifier systems for conventional radio receivers usually are designed to provide a single direct current output circuit at a potential of about 300 volts, or less, for operation of the conventional receiver tubes. However, there is a present need for an inexpensive rectifier system which will supply not only such a conventional output circuit, but also will supply a much higher unidirectional voltage for the cathode-ray tube of a small television receiver, with a minimum of additional apparatus. Known rectifier systems for supplying the required high voltage for such television receivers are not only bulky but heavy and expensive, because of the additional transformer winding that is necessary. In addition, many cheap rectifier tubes are incapable of withstanding the high peak inverse voltage developed in such high-voltage circuits.

It is an object of the invention, therefore, to provide a rectifier system for deriving from a single alternating current supply circuit two unidirectional voltages, one of which is considerably higher than obtainable from conventional rectifier circuits, that is simple and economical in its parts, light in weight, compact and highly effective for the purpose intended.

It is another object of the invention to provide a rectifier system of the type described in which the unidirectional output voltage may be increased by any desired number of steps each approximately equal to that of the supply circuit.

In accordance with the invention broadly, there is provided a rectifier system having an alternating current input circuit and a load circuit including an impedance across which there is developed a first rectified potential. In combination with such rectifier system, means are included for providing a second rectified potential which is higher than the first rectified potential and preferably considerably higher than that of said input circuit.

This means comprises an energy-storage means, a bilaterally-conductive circuit coupling the energy-storage means to the input circuit through the aforementioned load circuit, a second rectifier, and means for effectively coupling the energy-storage means and the second rectifier in series across the input circuit. The last-named coupling means comprises a load circuit across which there is developed the second rectified potential.

In accordance with a particular form of the invention, a rectifier system of the type described comprises an alternating current input circuit, a series of rectifiers, a plurality of energy-storage elements and a plurality of bilaterally-conductive circuits individually coupling the energy-storage elements across the rectifiers. There is also included a plurality of load circuits individually coupling each of the rectifiers across the input circuit through the energy-storage elements individual to preceding rectifiers in the series, thereby to derive across successive ones of said load circuits progressively higher rectified potentials.

For a better understanding of the present invention, together with other and further objects thereof, reference is had to the following description taken in connection with the accompanying drawing, and its scope will be pointed out in the appended claims.

Figure 2:
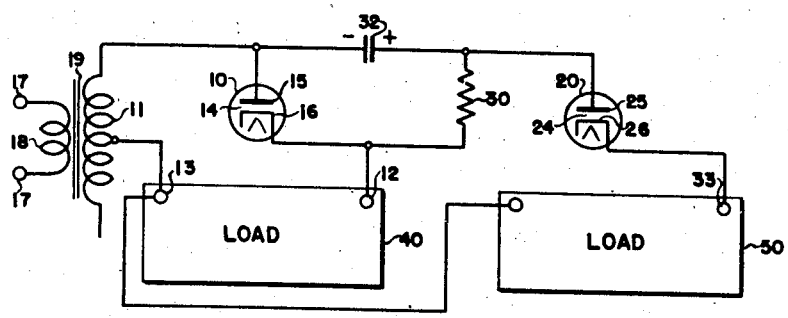
Figure 3:
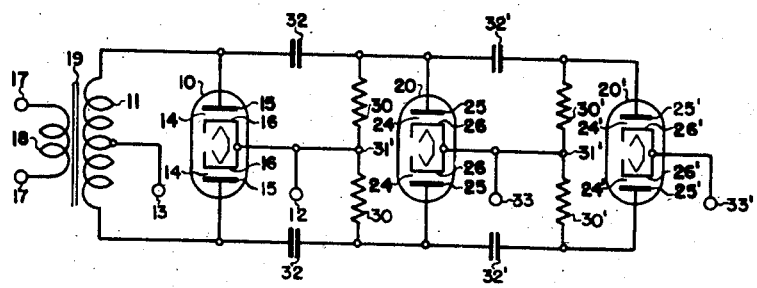

In the drawing Figs. 1 and 3 are circuit diagrams of different forms of a full-wave rectifier system embodying the invention, and Fig. 2 is a simplified diagram for explaining the operation of the invention.

Referring to Fig. 1 of the drawing, there is shown a rectifier system embodying the invention and comprising a full-wave rectifier tube 10 including a pair of diode rectifiers 14, 14, each comprising an anode 15 and a cathode 16. The important characteristics of such a rectifier are the allowable average plate current and the maximum allowable peak inverse voltage, that is, the largest negative voltage that may be applied to the anode with safety, which determines the maximum unidirectional voltage that can be obtained from the rectifier tube.

The rectifiers 14 are connected to opposite halves of a mid-tapped secondary winding 11 of a transformer 19, the primary winding 18 of which is connected to alternating current input-circuit terminals 17, 17 The center tap of winding 11 provides the negative terminal 13 of the direct current load circuit while the positive terminal 12 thereof is connected, as shown, to the common cathode 16 of the rectifiers 14. The cathode 16 may be coupled to another winding 9 of the transformer 19 for direct heating thereby.

The operation of the conventional full-wave rectifier just described is so well known to those skilled in the art that it is needless to include it here. It is sufficient to say that the terminals 12 and 13 provide a source of rectified unidirectional potential which is intermediate the peak and average values of the alternating voltage of one-half of secondary winding 11, depending upon the constants of the load connected between the load circuit terminals 12, 13, when the input terminals 17 of the transformer 19 are coupled to a source of alternating current.

To provide a unidirectional potential higher than that provided by rectifier 10, in accordance with this invention, there is provided a second full-wave rectifier tube 20, comprising a pair of diodes 24, 24, which may be of the same type as the full-wave rectifier tube 10, but which will generally be a tube of a lower current rating. As shown, the rectifier tube 20 is provided with indirectly heated cathodes 26, 26, heaters 21, 21 therefore being coupled to the same transformer winding 9 as the directly heated common cathode 16 of the rectifier tube 10. Intermediate the rectifier tubes 10 and 20 there is included means for providing a second rectified potential higher than the first rectified potential developed across the load-circuit terminals 12, 13, this means comprising an energy-storage means. Specifically, this means comprises a pair of energy-storage elements, such as condensers 32, individually connected across opposite halves of the transformer winding 11 through a pair of bilaterally-conductive circuits comprising impedance elements or resistors 30 of substantially equal resistance and through a common connection including the load circuit between terminals 13 and 12. By this connection, each condenser 32 and its associated resistor 30 are connected, in series, across one of the diodes 14, so that the condensers 32 become charged to unidirectional potentials by rectifiers 14. The diode rectifiers 24 are individually coupled across the two portions of the transformer winding 11 through condensers 32 and a common connection including the load circuit between terminals 13 and 33. The load circuit between the terminals 13 and 33 across which there is developed the higher unidirectional potential, usually comprising a resistance-capacitance filter and the high-voltage anode circuit of a cathode-ray tube, must have a resistance value considerably greater than that of the resistors 30, which, in turn, must be considerably greater than that of the resistance of the load circuit between terminals 13 and 12.

Referring to Fig. 2, which is the electrical equivalent of one-half of the circuit of Fig. 1, the operation of the invention may be explained in detail as follows. During a first positive half-cycle of input voltage, the half-wave rectifier 14 passes a current which flows through the circuit comprising load 40 largely to the exclusion of the remaining circuits due to its relatively lower impedance; that is to say, the rectifier 14, in effect, short-circuits the remaining portion of the circuit. During the succeeding negative half-cycle if input voltage, the rectifiers 14 and 24 are nonconductive so that current then flows only through the circuit comprising condenser 32, resistor 30, and load 40, thereby charging condenser 32 with the polarity indicated. It has been previously pointed out that the resistance of rectifier 14, in its conductive direction, and of load 40 is of a value considerably lower than that of the resistor 30. Hence, the current flowing through the load 40 during the positive half-cycles, when the rectifier 14 is conductive, is many times larger than that during the negative half-cycles and the terminals 12, 13 consequently provide a source of potential having a predominant unidirectional component but a small alternating component that may be filtered out as is conventional in rectifier circuits. During the succeeding positive half-cycle of input voltage, in addition to the normal rectification of rectifier 14, the rectifier 24 passes a current which flows through the circuit comprising condenser 32 and load 50 at a potential which is equal substantially to the sum of the input voltage of one-half of winding 11 and the voltage of the condenser 32. When a state of equilibrium has been reached, the charging current of the condenser 32 during the negative half-cycles is substantially equal to the discharging current of condenser 32 through load 50 during the positive half-cycles. Thus, the voltage across the load 50 can be made equal substantially to twice the voltage of one-half the supply winding 11 or any lesser value depending upon the relative impedances of the loads 40 and 50 and of the resistor 30 and the value of condenser 32 and is substantially independent of the first rectified potential developed across the load-circuit terminal 12, 13.

It will be appreciated that the rectifier system of Fig. 1 provides a rectified potential approximately double that of a conventional rectifier as well as a rectified potential of normal value, without increasing the cost of transforming the alternating current, because but a single relatively low-voltage transformer 19 is necessary; the only increase in cost is that of the second rectifier tube 20 and the inexpensive resistors 30 and condensers 32. The system of Fig. 1, in addition, is light in weight and compact in size, which factors make it ideal for use with a small television receiver.

As an example of the practical utility of the rectifier system of Fig. 1, in addition to the normal rectified potential, a 600-volt rectified potential may be derived from a power supply which is designed to deliver 300 volts when the current demands of the high-voltage supply are small, as for operating a cathode-ray tube. In this case, two full-wave rectifiers may be used, such as type 80 for rectifier 10 and type 6ZY5 for rectifier 20, the system delivering both voltages with a common negative terminal. By use of the latter type of rectifier, no additional heater winding is required on the transformer. In this connection another important feature of the invention exists by virtue of the fact that the cathodes and cathode heaters of the rectifier tube 20 are subjected to a potential difference only of the voltage of a single rectifier although the system develops a much greater voltage. For example, if the rectifier terminals 12 and 13 have a potential difference of 300 volts and the terminals 13 and 33 a potential difference of 600 volts, the insulation between the cathodes and heaters of the rectifiers 24 may be the same substantially as that of the rectifiers 14, a very desirable feature, when the cost and limitations of higher insulations are considered. For a high-voltage load of 1 megohm, the capacitance of each of the condensers 32 should be 0.25 microfarad and the resistance of each of the resistors 30 should be 100,000 ohms. The resistance of the low-voltage load must be much less than 100,000 ohms.

Referring now to Fig. 3, there is represented an extension of the arrangement of Fig. 1 to a system including a series of rectifier tubes 10, 20, 20' for developing progressively higher rectified potentials from a common alternating current supply winding 11, providing a common negative terminal 13 at its mid-tap. The circuit up to and including rectifier tube 20 is identical with that of Fig. 1 and corresponding elements have been given the same reference numerals. The rectifier stage including the tube 20' is coupled in cascade with the stage including rectifier tube 20 in a manner entirely similar to the coupling of the stage including rectifier tube 20 to the rectifier stage including tube 10. Briefly, the energy-storage condensers 32' are coupled across opposite portions of the winding 11 through resistors 30' and a common connection including high-voltage load circuit between terminal 33 and the common negative terminal 13. The diode rectifiers 24' of tube 20' are individually connected across the two portions of the winding 11 in series with the condensers 32 and 32' and a common connection including the high-voltage load circuit between terminal 33' and common negative terminal 13.

The operation of the system including the high-voltage rectifier stage of tube 20' is in all respects similar to that of the intermediate-voltage stage including the tube 20, described above, and need not be repeated in detail.

Thus, the rectified potential of the rectifier system of Fig. 3 between the common negative terminal 13 and any one of the positive terminals 12, 33, 33' is equal substantially to the sum of the incremental potentials of the preceding rectifier stages. That is to say, if the unidirectional voltage between terminals 13 and 12 is 300 volts, then the voltage between terminals 13 and 33' is 900 volts. It will also be apparent to those skilled in the art that a plurality of rectifier stages, such as those including rectifiers 20 and 20', may be connected in cascade to provide progressively higher rectified potentials, it then being necessary that the load resistances of the progressively higher voltage stages have progressively higher values.

From the above description of the Fig. 3 modification of the invention, it will be evident that the rectifier tubes 10, 20 and 20' comprise a series of rectifiers, that the condensers 32, 32' comprise a plurality or series of energy-storage elements, and that the resistors 30, 30' comprise a plurality or series of bilaterally-conductive circuits individually coupling the energy-storage elements across the rectifiers. It will further be evident that the load circuits comprising load-circuit terminals 13—12, 13—33, and 13—33' comprise a plurality of load circuits individually coupling each of the rectifiers across the input circuit through the energy-storage elements individual to preceding rectifiers in the series, thereby to derive across successive ones of the load circuits progressively higher rectified potentials.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A rectifier system comprising, a rectifier having an alternating current input circuit and a load circuit across which there is developed a first rectified potential, means for providing a second rectified potential higher than said first rectified potential comprising an energy-storage means, a bilaterally-conductive circuit coupling said energy-storage means to said input circuit through said load circuit, a second rectifier, and means for effectively coupling said energy-storage means and said second rectifier in series across said input circuit, said last-named means comprising a load circuit across which there is developed said second rectified potential.

2. A rectifier system comprising, a rectifier having an alternating current input circuit and a load circuit across which there is developed a first rectified potential, means for providing a second rectified potential higher than said first rectified potential comprising an energy-storage means, a bilaterally-conductive circuit coupling said energy-storage means to said input circuit through said load circuit, a second rectifier, and means for effectively coupling said energy-storage means and said second rectifier in series across said input circuit, said last-named means comprising a load circuit across which there is developed said second rectified potential substantially independent of said first rectified potential.

3. A rectifier system comprising, a rectifier having an alternating current input circuit and a load circuit across which there is developed a first rectified potential, means for providing a second rectified potential higher than said first rectified potential comprising an energy-storage element, a bilaterally-conductive circuit coupling said energy-storage element to said input circuit through said load circuit, a second rectifier, and means for effectively coupling said energy-storage element and said second rectifier in series across said input circuit, said last-named means comprising a load circuit across which there is developed said second rectified potential and the resistance of said last-named load circuit being substantially greater than that of said first load circuit.

4. A rectifier system comprising, a rectifier having an alternating current input circuit and a load circuit across which there is developed a first rectified potential, means for providing a second rectified potential higher than said first rectified potential comprising an energy-storage element, means including an impedance element for coupling said energy-storage element to said input circuit through said load circuit, a second rectifier, and means for effectively coupling said energy-storage element and said second rectifier in series across said input circuit, said last-named means comprising a load circuit across which there is developed said second rectified potential and the resistance of said last-named load circuit being substantially greater than that of said impedance element.

5. A rectifier system comprising, a rectifier having an alternating current input circuit and a load circuit across which there is developed a first rectified potential, means for providing a second rectified potential higher than said first rectified potential comprising an energy-storage element, means including an impedance element for coupling said energy-storage element to said input circuit through said load circuit, a second rectifier, and means for effectively coupling said energy-storage element and said second rectifier in series across said input circuit, said last-named means comprising a load circuit across which there is developed said second rectified potential, and the resistance of said last-named load circuit being substantially greater than that of said impedance element and that of the load circuit of said first rectifier.

6. A rectifier system comprising, a rectifier having an alternating current input circuit and a load circuit across which there is developed a first rectified potential, means for providing a second rectified potential higher than said first rectified potential comprising an energy-storage element, means including an impedance element for coupling said energy-storage element to said input circuit through said load circuit, a second rectifier, and means for effectively coupling said energy-storage element and said second rectifier in series across said input circuit, said last-named means comprising a load circuit across which there is developed said second rectified potential and the resistance of said impedance element being greater than that of said first load circuit.

7. A rectifier system comprising, a rectifier having an alternating current input circuit and a load circuit across which there is developed a first rectified potential, means for providing a second rectified potential higher than said first rectified potential comprising a condenser, means including a resistor coupling said condenser to said input circuit through said load circuit, a second rectifier, and means for effectively coupling said condenser and said second rectifier in series across said input circuit, said last-named means comprising a load circuit across which there is developed said second rectified potential, and the resistance of said last-named load circuit being substantially greater than that of said resistor.

8. A rectifier system comprising, a rectifier having an alternating current input circuit and a load circuit across which there is developed a first rectified potential, means coupling said rectifier and said load circuit in series across said input circuit, means for providing a second rectified potential higher than said first rectified potential comprising a circuit including a condenser and a resistor in parallel with said rectifier, a second rectifier having a second load circuit across which there is developed said second rectified potential, and means for effectively coupling said second rectifier in series with said condenser and said second load circuit across said input circuit.

9. A rectifier system comprising, a full-wave rectifier having an alternating current input circuit provided with a mid-tap constituting a terminal for a load circuit across which there is developed a first rectified potential, means for providing a second rectified potential higher than said first rectified potential comprising a pair of energy-storage elements, a pair of bilaterally-conductive circuits individually coupling said energy-storage elements to said input circuit through said load circuit, a second full-wave rectifier, and means for effectively coupling said energy-storage elements and said second rectifier in series across said input circuit, said second rectifier having a load circuit connected to said terminal across which there is developed said second rectified potential.

10. A rectifier system comprising, a rectifier having an alternating current input circuit and a load circuit across which there is developed a first rectified potential, means for providing a series of rectified potentials progressively higher than said first rectified potential comprising a series of rectifiers each having a load circuit, a corresponding series of energy-storage elements, a series of bilaterally-conductive circuits individually coupling each of said energy-storage elements to said input circuit through the preceding load circuit, and means for effectively coupling each of said series of rectifiers in series with preceding ones of said energy-storage elements across aid input circuit to derive across said last-named load circuits said series of progressively higher rectified potentials.

11. A rectifier system comprising, a rectifier having an alternating current input circuit and a load circuit across which there is developed a first rectified potential, means for providing a second rectified potential higher than said first rectified potential comprising a condenser, a bilaterally-conductive circuit coupling said condenser in parallel with said rectifier, a second rectifier having a second load circuit across which there is developed said second rectified potential, and means for effectively coupling said second rectifier in series with said condenser and said second load circuit across said input circuit.

12. A rectifier system comprising, an alternating current input circuit, a series of rectifiers, a plurality of energy-storage elements, a plurality of bilaterally-conductive circuits individually coupling said energy-storage elements across said rectifiers, and a plurality of load circuits individually coupling each of said rectifiers across said input circuit through the energy-storage elements individual to preceding rectifiers in said series, thereby to derive across successive ones of said load circuits progressively higher rectified potentials.

13. A rectifier system comprising, an alternating current input circuit, a series of rectifiers, a plurality of impedances individually interposed between successive rectifiers, a plurality of energy-storage elements coupled across individual ones of said rectifiers and the impedance adjacent thereto in series, and a plurality of load circuits coupling individual ones of said rectifiers across said input circuit through the energy-storage elements individual to preceding rectifiers in said series relation, thereby to derive across successive ones of said load circuits unidirectional voltages of increasingly larger magnitude.

ROBERT B. J. BRUNN.